US012417754B2

(12) United States Patent
Matsuda et al.

(10) Patent No.: US 12,417,754 B2
(45) **Date of Patent: *Sep. 16, 2025**

(54) ELECTRIC GUITAR BODY-STRUCTURE AND ELECTRIC GUITAR

(71) Applicant: YAMAHA CORPORATION, Hamamatsu (JP)

(72) Inventors: Hideto Matsuda, Hamamatsu (JP); Kenta Ishizaka, Hamamatsu (JP)

(73) Assignee: YAMAHA CORPORATION, Hamamatsu (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/457,430

(22) Filed: Aug. 29, 2023

(65) Prior Publication Data

US 2023/0402022 A1 Dec. 14, 2023

Related U.S. Application Data

(63) Continuation of application No. 17/728,253, filed on Apr. 25, 2022, which is a continuation of application No. PCT/JP2020/045271, filed on Dec. 4, 2020.

(30) Foreign Application Priority Data

Dec. 5, 2019 (JP) ................................ 2019-220464

(51) Int. Cl.
*G10D 3/02* (2006.01)
*G10D 1/08* (2006.01)

(52) U.S. Cl.
CPC .............. *G10D 3/02* (2013.01); *G10D 1/085* (2013.01)

(58) Field of Classification Search
CPC ............ G10D 3/02; G10D 1/085; G10H 3/18
See application file for complete search history.

(56) References Cited

U.S. PATENT DOCUMENTS

| | | | | |
|---|---|---|---|---|
| 4,334,452 | A | 6/1982 | Morrison, III et al. | |
| 11,030,982 | B1 | 6/2021 | Monjardo | |
| 2010/0031807 | A1* | 2/2010 | Fiocco | G10D 1/085 84/743 |
| 2019/0287497 | A1 | 9/2019 | Shaw et al. | |

FOREIGN PATENT DOCUMENTS

| | | | |
|---|---|---|---|
| JP | 2001154662 | A | 6/2001 |
| WO | 2016094540 | A1 | 6/2016 |

OTHER PUBLICATIONS

International Search Report issued in Intl. Appln. No. PCT/JP2020/045271 mailed on Jan. 26, 2021. English translation provided.
Written Opinion issued in Intl. Appln. No. PCT/JP2020/045271 mailed on Jan. 26, 2021. English translation provided.
Office Action issued in U.S. Appl. No. 17/728,253 mailed Jun. 23, 2023.

(Continued)

*Primary Examiner* — Kimberly R Lockett
(74) *Attorney, Agent, or Firm* — ROSSI, KIMMS & McDOWELL LLP

(57) ABSTRACT

A body structure of an electric guitar includes a body including a first chamber and a second chamber formed spaced apart from each other, and a slit that connects the first chamber and the second chamber.

11 Claims, 4 Drawing Sheets

(56) References Cited

OTHER PUBLICATIONS

Extended European Search Report issued in European Appln. No. 20896673.9 mailed Oct. 30, 2023.
Office Action issued in U.S. Appl. No. 17/728,253, mailed Feb. 14, 2024.
Office Action issued in Chinese Patent Application No. 202080075262.8 mailed Jan. 9, 2025.
Office Action issued in U.S. Appl. No. 17/728,253 mailed Jan. 16, 2025.
Office Action issued in Japanese Appln. No. 2025-013830, mailed on Jul. 29, 2025.

* cited by examiner

ELECTRIC GUITAR BODY-STRUCTURE AND ELECTRIC GUITAR

CROSS-REFERENCE TO RELATED APPLICATIONS

The present application is a continuation application of International Application No. PCT/JP2020/045271, filed Dec. 4, 2020, which claims priority to Japanese Patent Application No. 2019-220464, filed Dec. 5, 2019. The contents of these applications are incorporated herein by reference.

BACKGROUND OF THE INVENTION

Field of the Invention

The present disclosure relates to an electric guitar body-structure and an electric guitar.

Priority is claimed on Japanese Patent Application No. 2019-220464, filed Dec. 5, 2019, the content of which is incorporated herein by reference.

Description of Related Art

Japanese Unexamined Patent Application, First Publication No. 2001-154662 (hereinafter referred to as Patent Document 1) discloses a technique capable of producing a beautiful and reverberant sound by providing a plurality of grooves on the inner side of the body plate of the hollow body of a stringed instrument such as an acoustic guitar or a violin. A beautiful and reverberant sound is obtained by appropriately controlling the acoustic phenomenon of the body.

SUMMARY OF THE INVENTION

In some cases, a plurality of chambers (cavities) are provided in the interior of bodies of electric guitars and the like for weight reduction. However, if there are a plurality of chambers having substantially the same volume in this type of body, the resonance frequencies of the plurality of chambers become substantially the same, giving rise to the necessary to control the acoustic phenomenon of the body. It is difficult to control the acoustic phenomenon of the body even if a plurality of grooves as in Patent Document 1 are provided on the inner surface of the chambers of the body of the electric guitar.

The present disclosure has been made in view of the above circumstances, and has as its object to provide an electric guitar body-structure capable of controlling the acoustic phenomenon of a body having a plurality of chambers, and an electric guitar including the same.

A first aspect of the present disclosure is an body structure of an electric guitar, including: a body including a first chamber and a second chamber formed spaced apart from each other, and a slit that connects the first chamber and the second chamber.

A second aspect of the present disclosure is an electric guitar including the body structure.

EMBODIMENTS FOR CARRYING OUT THE INVENTION

Hereinbelow, embodiments of the present disclosure will be described with reference to FIGS. 1 to 3.

Figure 1:
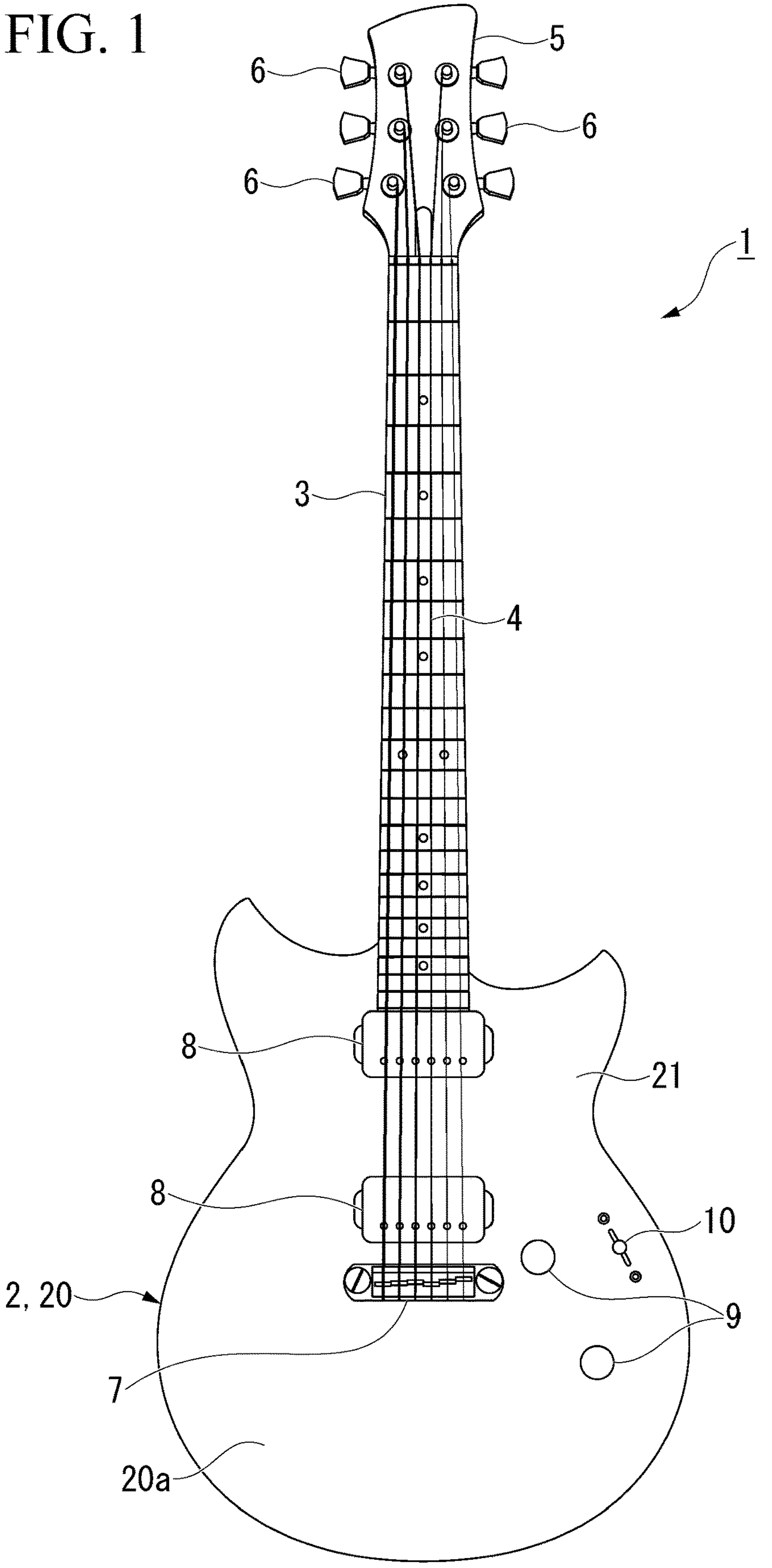
FIG. 1 is a plan view of an electric guitar according to an embodiment of the present disclosure as viewed from the front side of the body.

As shown in FIG. 1, an electric guitar 1 according to the present embodiment incudes a body structure 2, a neck 3, and strings 4.

The neck 3 is connected to an end portion of the body structure 2 and extends in a direction away from the body structure 2 (upward direction in FIG. 1). A head 5 forming the distal end portion in the longitudinal direction of the neck 3 is provided with pegs 6 around which an end portion of each of the strings 4 is wound. The strings 4 are stretched along the longitudinal direction of the neck 3.

The body structure 2 includes a body 20. In this embodiment, the body 20 constitutes the entire body structure 2. Abridge 7, an electromagnetic pickup 8, controllers, and the like are attached to the body 20. The bridge 7, the electromagnetic pickup 8, and the controllers are exposed on a front side surface 20*a* (hereinafter referred to as the front surface 20*a*) of the body 20 facing the thickness direction of the body 20 (direction orthogonal to the paper surface in FIG. 1).

One end of each string 4 is fastened to the bridge 7. The electromagnetic pickup 8 is located between the neck 3 and the bridge 7 in the longitudinal direction of the neck 3. A plurality of the electromagnetic pickups 8 (two in the illustrated example) are arranged in the longitudinal direction of the neck 3. The controllers adjust the volume, tone, and the like of the acoustic signal output from the electromagnetic pickups 8. The controllers include two volume switches 9, a pickup selector 10 for switching the electromagnetic pickups 8 to be activated, and the like.

The body 20 of the present embodiment has a top member 21 having a small thickness dimension and a back member 22 (see FIGS. 2 and 3) having a thickness dimension larger than that of the top member 21. The top member 21 and the back member 22 overlap with each other in the thickness direction of the body 20 to form the body 20. The front surface 20*a* of the body 20 from which the bridge 7 and the like are exposed is constituted by the top member 21.

Figure 2:
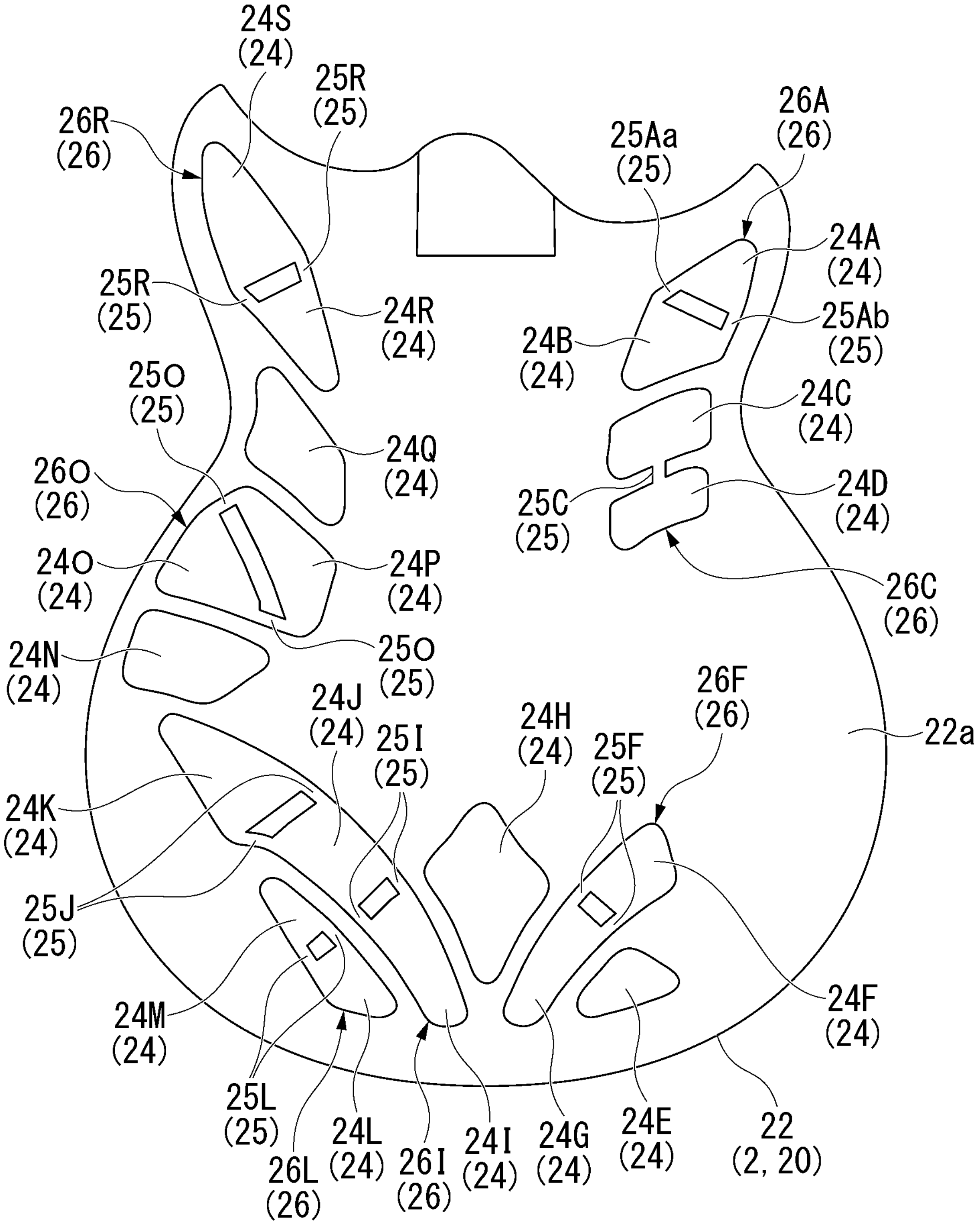
FIG. 2 is a plan view of a back member constituting the body of the electric guitar of FIG. 1 as viewed from the front side thereof.
Figure 3:
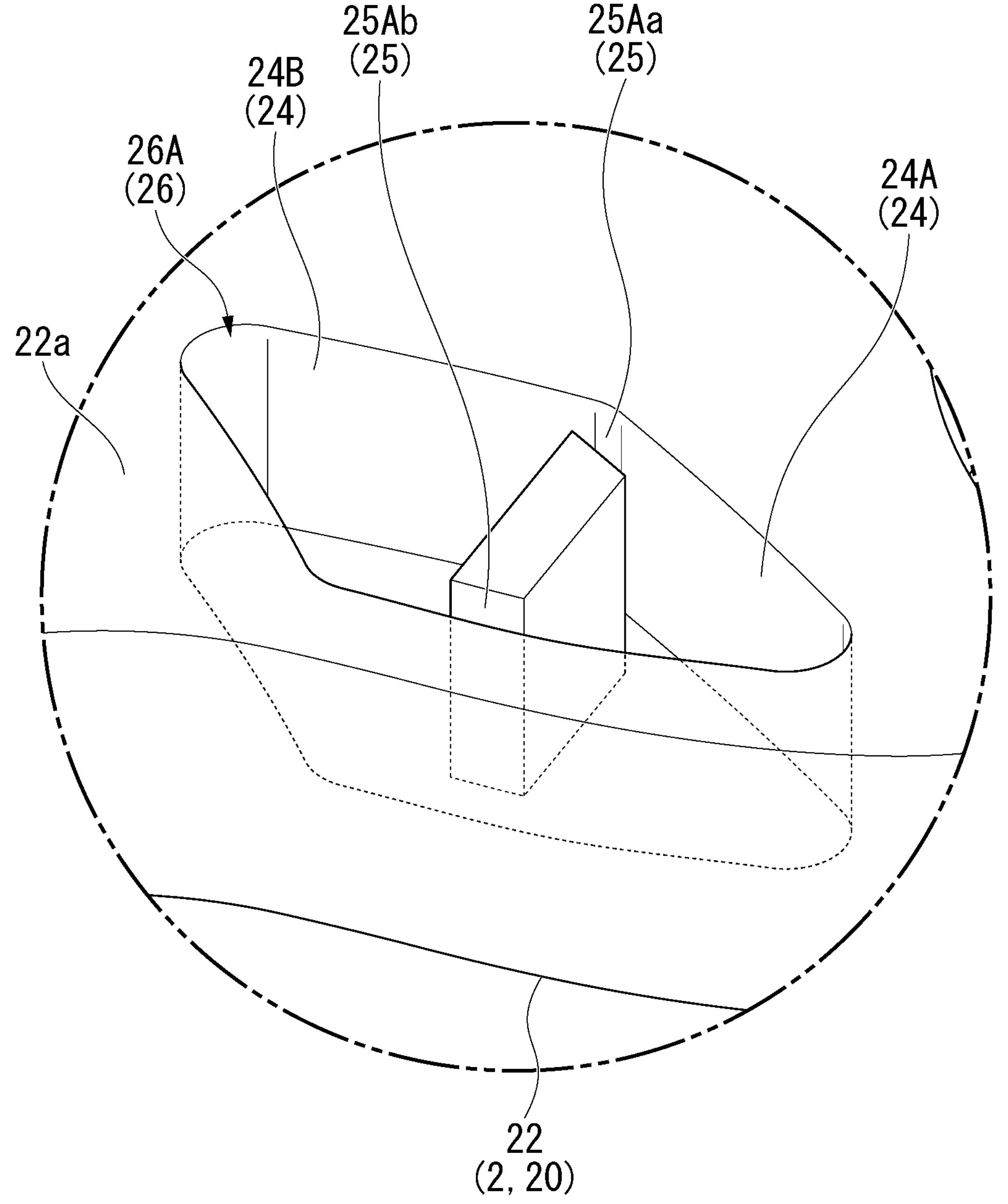
FIG. 3 is an enlarged perspective view showing two chambers and slits in the back member of FIG. 2.

As shown in FIGS. 2 and 3, the body 20 has a plurality of chambers 24 (19 in the illustrated example) and slits 25.

The plurality of chambers 24 are cavities formed for weight reduction of the body 20. The plurality of chambers 24 are formed at intervals from each other. Specifically, the plurality of chambers 24 are arranged in a direction orthogonal to the thickness direction of the body 20. The plurality of chambers 24 are formed in a region of the body 20 other than the region to which the neck 3, the bridge 7, the electromagnetic pickups 8, the controllers (see FIG. 1) and the like are attached, when viewed from the thickness direction of the body 20. Although not shown in FIG. 2, the body 20 is also formed with holes and recess portions for accommodating the bridge 7, the electromagnetic pickups 8, and the controllers.

In the present embodiment, the plurality of chambers 24 are each formed by being recessed from a front surface 22*a* of the back member 22 facing the top member 21. The plurality of chambers 24 become cavities that each do not open to the outside of the body 20 by superimposing the top member 21 on the front surface 22*a* of the back member 22.

The slit 25 connects two chambers 24 (first chamber 24A and second chamber 24B) adjacent to each other among the plurality of chambers 24. The slit 25, similarly to the chambers 24, does not open to the outside of the body 20.

The slit 25 extends in the arrangement direction of the two chambers 24. The direction in which the slit 25 extends may be parallel to the arrangement direction of the two chambers 24, or may be inclined thereto.

The cross-sectional area of the slit 25 orthogonal to the arrangement direction of the two chambers 24 is smaller than each cross-sectional area of the two chambers 24 orthogonal to the arrangement direction of the two chambers 24. The cross-sectional area of each chamber 24 used for comparison with the cross-sectional area of the slit 25 may be, for example, the cross-sectional area of the chamber 24 at the maximum in the arrangement direction of the two chambers 24.

The volume of the slit 25 is sufficiently smaller than the volume of each of the two chambers 24.

The number of slits 25 connecting the two chambers 24 may be one or two or more (a plurality). When the number of slits 25 is a plurality, the total cross-sectional area of the plurality of slits 25 is smaller than each cross-sectional area of the two chambers 24. Further, the total volume of the plurality of slits 25 is sufficiently small as compared with each volume of the two chambers 24.

Similar to the chamber 24, the slit 25 of the present embodiment is formed by being recessed from the front surface 22*a* of the back member 22. In FIG. 3, the depth dimension of the slit 25 is the same as the depth dimension of the chamber 24, but for example may be smaller than the depth dimension of the chamber 24. Also, the slit 25 may be formed so as not to open to the front surface 22*a* of the back member 22, for example.

The volumes of the two chambers 24 (first chamber 24 and second chamber 24) connected to each other by the slit 25 may be, for example, substantially the same. The fact that the volumes of the two chambers 24 are substantially the same means that, for example, the ratio of the volume of the second chamber 24 to the first chamber 24 is 70% or more and 130% or less.

By connecting the two chambers 24 to each other with the slit 25, a new chamber 26 (hereinbelow referred to as a composite chamber 26) including the two chambers 24 and the slit 25 is formed. The volume of the composite chamber 26 is larger than the volume of each of the two chambers 24.

The aforementioned chambers 24 and the slit 25 will be described more specifically.

As shown in FIG. 2, 19 of the chambers 24 (24A to 24S) are lined up substantially along the edge of the back member 22 as seen from the front surface 22*a* side. In the following description, the numbers 1, 2, . . . 18 and 19 are attached in an approximately clockwise order from the chamber 24A located at the upper right of the back member 22 (body 20) to the chamber 24S located at the upper left.

The first and second chambers 24A and 24B located in the upper right portion of the back member 22 (body 20) in FIG. 2 are connected by two slits 25Aa and 25Ab as shown in FIGS. 2 and 3. As a result, the composite chamber 26A including the first and second chambers 24A and 24B and the two slits 25Aa and 25Ab is formed. The two slits 25Aa and 25Ab are arranged in the width direction that is orthogonal to the arrangement direction of the first and second chambers 24A and 24B and to the thickness direction of the back member 22 (body 20). Further, the two slits 25Aa and 25Ab are located at both ends of the first and second chambers 24A and 24B in the width direction.

As shown in FIG. 2, a mode in which sixth and seventh chambers 24F and 24G are connected by a slit 25F to form a composite chamber 26F, a mode in which 12th and 13th chambers 24L and 24M are connected by a slit 25L to form a composite chamber 26L, a mode in which 15th and 16th chambers 240 and 24P are connected by a slit 250 to form a composite chamber 260, and a mode in which 18th and 19th chambers 24R and 24S are connected by a slit 25R to form a composite chamber 26R are all the same as the mode in which the first and second chambers 24A and 24B are connected by the slits 25Aa and 25Ab to form the composite chamber 26A.

The third and fourth chambers 24C and 24D are connected by one slit 25C. As a result, the composite chamber 26C including the third and fourth chambers 24C and 24D and the one slit 25C is formed. The one slit 25C is located in the middle of the third and fourth chambers 24C and 24D in the width direction orthogonal to the arrangement direction of the third and fourth chambers 24C and 24D and to the thickness direction of the back member 22 (body 20). The slit 25C may be located at an end portion of the third and fourth chambers 24C and 24D in the width direction, for example.

The 10th chamber 24J is connected to the 9th chamber 241 and the 11th chamber 24K located on both sides thereof by slits 251 and 25J, respectively. That is, the 9th to 11th three chambers 241 to 24K are connected by the slits 251 and 25J. As a result, a composite chamber 261 including the 9th to 11th chambers 241 to 24K and the slits 251 and 25J is formed. The mode in which the 9th and 10th chambers 241 and 24J are connected by the slits 251 and the mode in which the 10th and 11th chambers 24J and 24K are connected by the slits 25J are each the same as the mode in which the first and second chambers 24A and 24B are connected by the slits 25Aa and 25Ab.

The fifth, eighth, 14th and 17th chambers 24E, 24H, 24N, 24Q are not connected to other chambers 24.

As described above, according to the body structure 2 of the present embodiment and the electric guitar 1 including the body structure 2, by connecting the two chambers 24 with the slit 25, the volume of the composite chamber 26 which includes the two chambers 24 and the slit 25 is larger than the volume of each of the two chambers 24. As a result, the resonance frequency of the composite chamber 26 is lower than the resonance frequency of each of the two chambers 24. That is, by controlling the volumes of the chambers 24 and 26, it is possible to make the resonance frequencies of the plurality of chambers 24 and 26 formed in the body 20 different from each other. For example, although the resonance frequencies of two chambers 24 having substantially the same volume are approximately the same, by connecting these two chambers 24 with the slit 25, the number of chambers 24 having substantially the same resonance frequency can be reduced.

This makes it possible to control the acoustic phenomenon of the body 20. Accordingly, even the body 20 of the electric guitar 1 having a plurality of weight-reducing chambers 24 can generate a beautiful and reverberant sound.

Further, in the body structure 2 of the present embodiment, the cross-sectional area of the slit 25 connecting the two chambers 24 is smaller than the cross-sectional area of each of the two chambers 24. As a result, it is possible to secure a chamber having a large volume (that is, the composite chamber 26) while suppressing a decrease in the rigidity of the body 20.

In the body structure 2 of the present embodiment, the resonance frequency of the composite chamber 26 including the two chambers 24 and the slit 25 can be controlled by appropriately changing the number of the slits 25 connecting the two chambers 24. Thereby it is possible to control the acoustic phenomenon of the body 20.

Although the present disclosure has been described in detail above, the present disclosure is not limited to the above embodiments, and various modifications can be made without departing from the spirit of the present disclosure.

Figure 4:
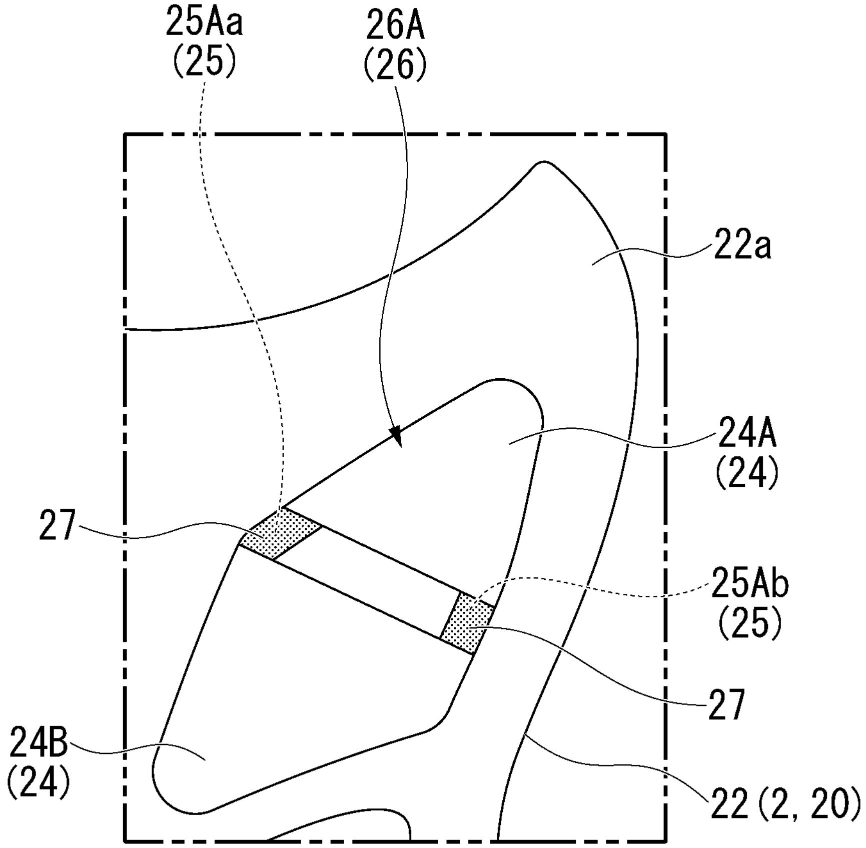
FIG. 4 is an enlarged plan view showing main parts of an electric guitar body according to another embodiment of the present disclosure.

In some embodiments of the present disclosure, the body structure 2 may have a sound absorbing material 27 housed in the slit 25, as shown for example in FIG. 4. The sound absorbing material 27 is a member that absorbs sound, such as urethane foam. In such a configuration, the resonance frequency of the composite chamber 26 including the two chambers 24 and the slit 25 connecting them can be controlled by the sound absorbing material 27. Thereby, the acoustic phenomenon of the body 20 can be controlled.

In some embodiments of the present disclosure, the cross-sectional area of the slit 25 may be the same as, for example, the cross-sectional area of each of the two chambers 24.

According to some embodiments of the present disclosure, it is possible to control the acoustic phenomenon of the body of an electric guitar having a plurality of chambers.

The disclosure invention can be applied to an electric guitar, particularly the body of an electric guitar. According to the present invention, it is possible to control the acoustic phenomenon of the body of an electric guitar having a plurality of chambers.

What is claimed is:

1. A body structure of an electric guitar, comprising:

a body comprising a top member and a back member that overlap to form the body, the back member comprising:
- a first chamber;
- a second chamber spaced apart from the first chamber; and
- a slit that connects the first chamber and the second chamber to each other, wherein the first chamber, the second chamber, and the slit do not open to outside of the body in a state where the top member overlaps with the back member to form the body, and wherein the first chamber and the second chamber are formed in a region of the body other than regions to which a neck, a bridge, electromagnetic pickups, and controllers are attached, when viewed from a thickness direction of the body.

2. The body structure of the electric guitar according to claim 1, wherein a cross-sectional area of the slit taken along a direction orthogonal to an arrangement direction of the first chamber and the second chamber is smaller than a cross-sectional area of the first chamber and a cross-sectional area of the second chamber taken along the direction orthogonal to the arrangement direction.

3. The body structure of the electric guitar according to claim 1, wherein a ratio of a volume of the second chamber to a volume of the first chamber is 70% or more and 130% or less.

4. The body structure of the electric guitar according to claim 1, wherein the body comprises a plurality of slits connecting the first chamber and the second chamber to each other.

5. The body structure of the electric guitar according to claim 1, further comprising a sound absorbing material disposed in the slit.

6. An electric guitar comprising the body structure according to claim 1.

7. The body structure of the electric guitar according to claim 1, wherein the top member has a first thickness and the back member has a second thickness greater than the first thickness.

8. The body structure of the electric guitar according to claim 7, wherein the first chamber is a first recessed portion of a front surface of the back member that faces the top member, and the second chamber is a second recessed portion of the front surface of the back member that faces the top member.

9. The body structure of the electric guitar according to claim 8, wherein the slit that connects the first chamber and the second chamber to each other is a third recessed portion of the front surface of the back member that faces the top member.

10. The body structure of the electric guitar according to claim 9, wherein a depth of the third recessed portion equals a depth of the first recessed portion and a depth of the second recessed portion.

11. The body structure of the electric guitar according to claim 9, wherein a depth of the third recessed portion is less than a depth of the first recessed portion and a depth of the second recessed portion.

* * * * *